July 17, 1934.   G. A. WHITING   1,966,575
AUTOMATIC WELD ROD MANUFACTURING APPARATUS
Filed Nov. 5, 1931   3 Sheets-Sheet 1
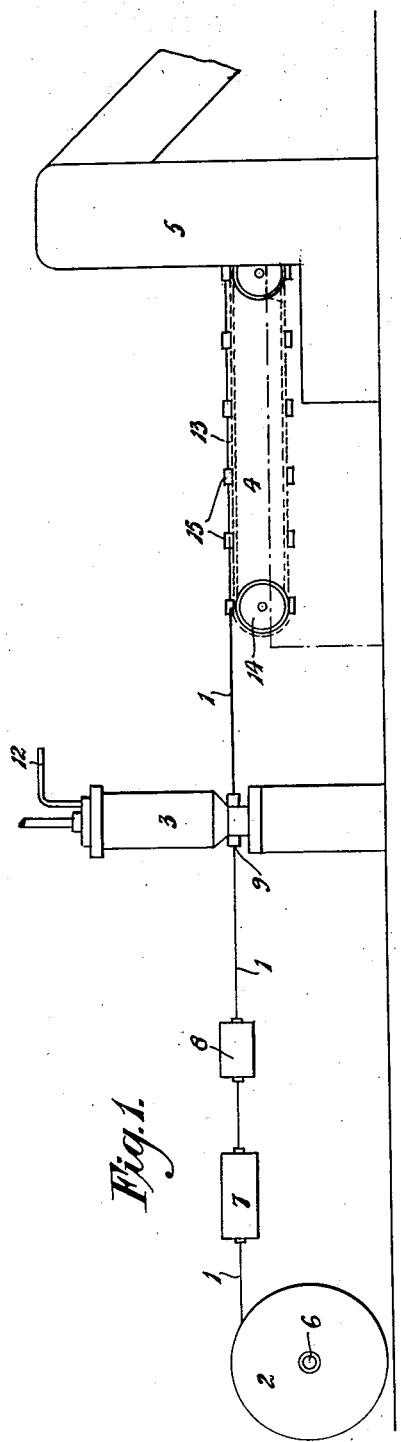
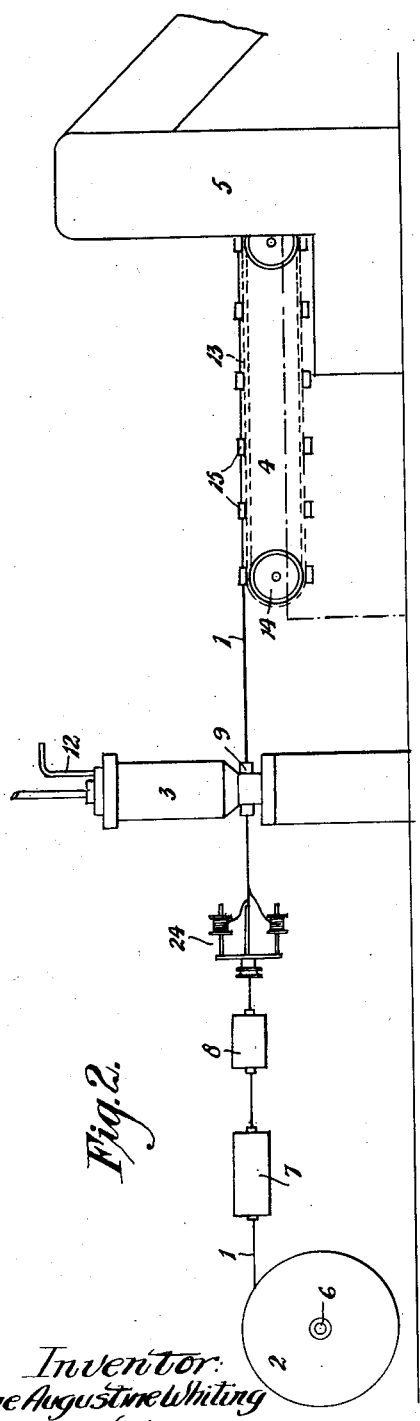
Inventor:
George Augustine Whiting
By Williams, Bradbury, McCalib & Hinkle, Attys.

July 17, 1934.   G. A. WHITING   1,966,575
AUTOMATIC WELD ROD MANUFACTURING APPARATUS
Filed Nov. 5, 1931   3 Sheets-Sheet 2
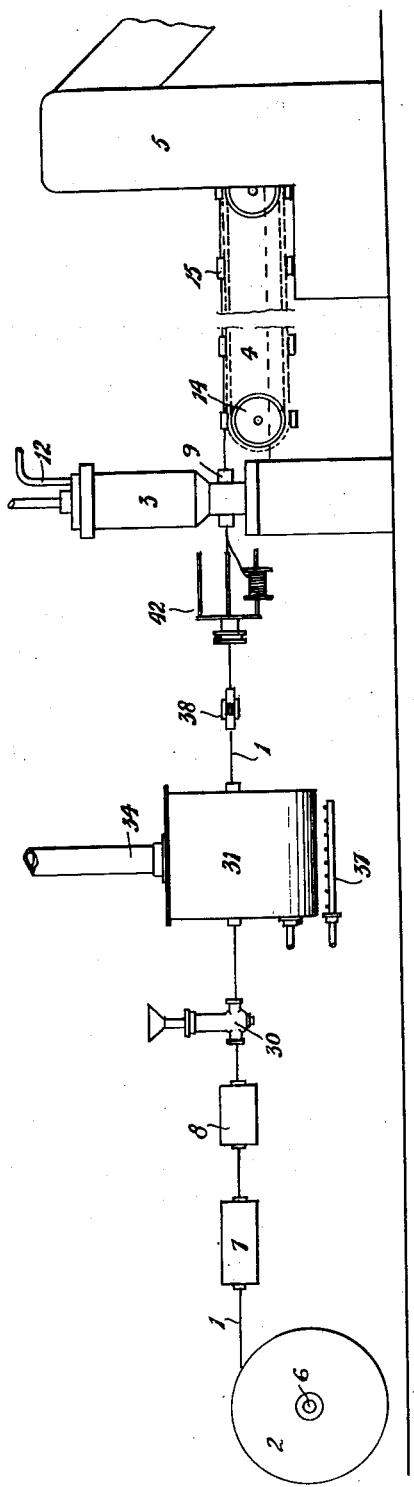
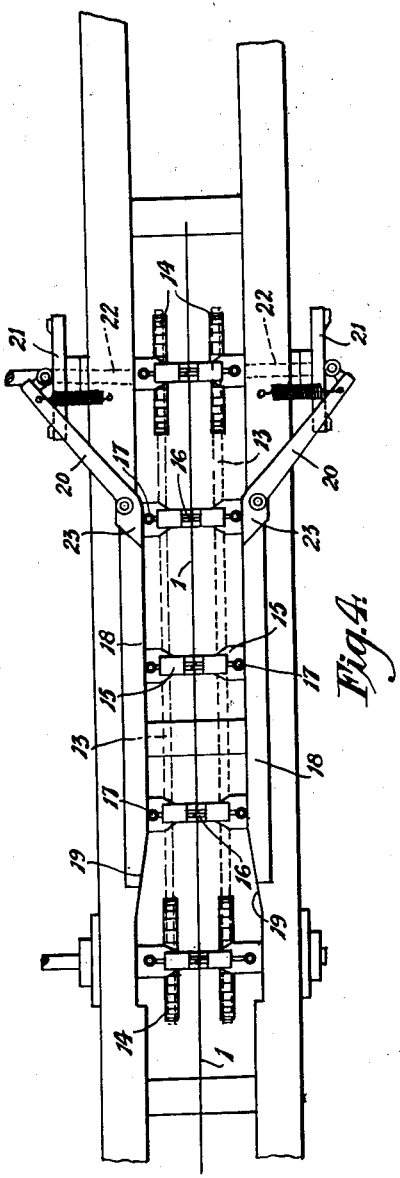
Inventor:
George Augustine Whiting
By Williams, Bradbury,
McCaleb & Hinkle   Attys.

July 17, 1934.  G. A. WHITING  1,966,575
AUTOMATIC WELD ROD MANUFACTURING APPARATUS
Filed Nov. 5, 1931   3 Sheets-Sheet 3

Inventor:
George Augustine Whiting
By Williams, Bradbury, McCaleb & Hinkle, Attys.

Patented July 17, 1934

1,966,575

UNITED STATES PATENT OFFICE 1,966,575

AUTOMATIC WELD ROD MANUFACTURING APPARATUS

George Augustine Whiting, Hawthorn, Victoria, Australia, assignor to E. M. F. Electric Company Proprietary Limited, North Carlton, Victoria, Australia Application November 5, 1931, Serial No. 573,120
In Australia April 23, 1931

13 Claims. (Cl. 219—8)

This invention relates to an improved apparatus for manufacturing covered electrodes or weld rods used in electric arc welding.

An object of the invention is to provide such apparatus by means of which the manufacturing operations are performed continuously and automatically from the continuous bare wire wound on a reel or the like to the flux coated rods which have been severed into requisite or predetermined length and dried, such method of manufacture enabling electrodes to be manufactured more expeditiously and at reduced cost compared with prior methods of manufacture, while also minimizing damage to the flux coating of the said rods.

Another object of the invention is to provide such an apparatus which is of simple construction, efficient in operation and automatic in action.

The apparatus is automatic in its action and consists essentially of means for feeding the fusible wire continuously from a reel or the like, an extrusion of coating apparatus for applying the flux coating to the continuous wire, means for severing the continuous coated wire into rods of requisite length, and transfer means for depositing the coated rods into a drying oven. The wire may be pushed through the apparatus by appropriate means or it can be drawn through the apparatus by means of a draw-bench or the like, which receives the coated continuous wire passing from the extrusion or coating apparatus. The severing means may be embodied in the draw-bench, which has grippers that function both to draw the wire through the apparatus and to sever the wire into rods of requisite length.

The apparatus may also include means for straightening the wire as it is being fed from the reel, means for serrating the wire, and means for winding asbestos yarn or other yarn or wire onto the continuous wire prior to the application of the flux coating. In lieu of the winding means, the apparatus may include means for applying an adhesive to the continuous wire, means for applying asbestos fibre, organic fibre, or the like in loose state to the adhesive coated wire, means for trimming the fibre covered wire, and, if desired, means for winding a cotton or other thread onto the fibre covered wire.

In the accompanying drawings to which reference is now made:—

Fig. 1 is a schematic view illustrating the improved manufacturing method and apparatus as adapted for the manufacture of plain flux coated electrodes.

Fig. 2 is a view of similar character to Fig. 1, illustrative of the method and apparatus as adapted for manufacturing electrodes of the type having asbestos yarn or other yarn or wire wound thereon.

Fig. 3 is also a schematic view illustrating the method and apparatus as used for manufacturing electrodes of the kind having asbestos or organic fibre applied in loose state to the fusible cores.

Fig. 4 is a plan view of the draw-bench employed for drawing the continuous wire through the apparatus and for severing it after coating into rods of requisite length.

Figure 8:
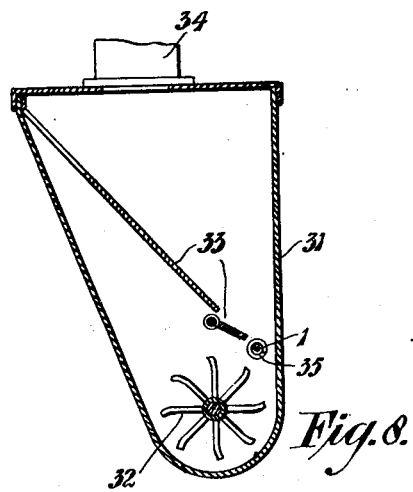
Fig. 8 is a cross-sectional view of the means for applying asbestos fibre or organic fibrous material in loose state to the continuous wire.
Figure 9:
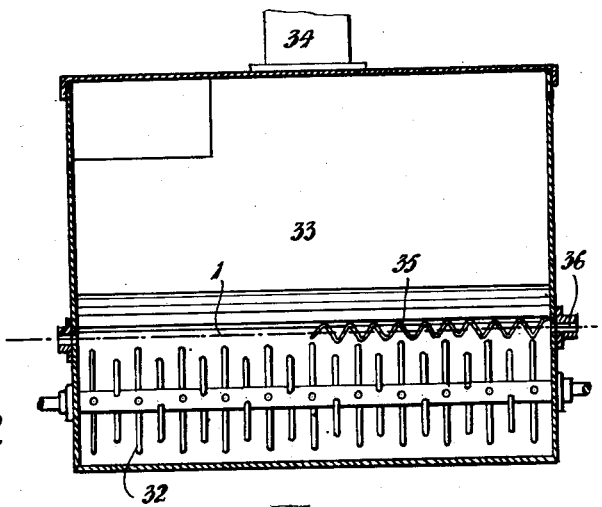
Fig. 9 is a longitudinal sectional view of Fig. 8.
Figure 5:
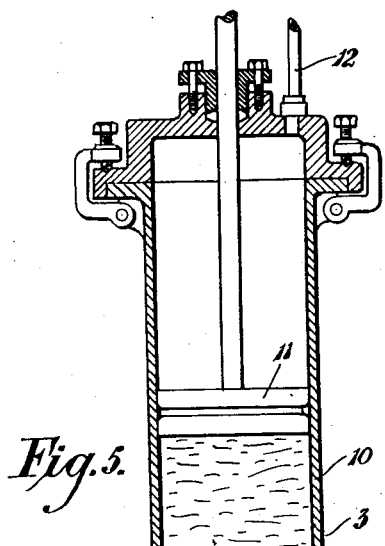
Fig. 5 is a sectional view of a suitable form of extrusion or coating apparatus for applying the flux coating to the continuous wire.

Referring initially to the manufacture of plain flux coated electrodes as shown by Fig. 1 of the drawings, the improved method of manufacture consists essentially in feeding a continuous fusible wire 1 from a reel 2, passing the continuous wire through the extrusion or coating apparatus 3 to apply the flux coating, severing the continuous coated wire into weld rods of requisite length by means such as cutters embodied in the draw-bench 4, and transferring the coated rods to the drying oven 5 through which they are passed. The reel 2 is rotatably mounted on a suitable axis 6 and it may consist of the usual reel upon which the welding wire is supplied from the wire manufacturer. The wire as it unwinds from the reel may be passed through a wire straightening device 7 of any well-known character. From the straightening device, the wire may be passed through serrating means 8 consisting, for example, of two inwardly rotating serrated wheels acting against opposite sides of the wire. The serrating of the wire assists in the feeding of the same through the apparatus and furthermore improves the adhesion of the flux coating to the wire by providing a keying surface thereon.

After the serrating operation, the continuous wire is passed through the die or nozzle 9 of the extrusion or coating apparatus 3. Said apparatus consists of a cylinder 10 for the plastic flux mixture and a plunger 11 for extruding the said mixture through the nozzle or die to form a continuous and substantially thick flux coating around the wire as it passes through the nozzle or die. The plunger 11 is acted upon by compressed air or other fluid under pressure, which is admitted into the upper portion of the cylinder through a pipe 12. The cylinder 10 may have a suitable mechanical agitator, such as a coiled spring 9a, adjacent to or surrounding the inner end of the nozzle 9 for the purpose of preventing the separation of the fluid constituents of the flux mixture from the solids thereof, which separation tends to occur in composite flux mixtures when under pressure.

The flux coated wire passing from the extrusion apparatus travels to the combined draw bench and severing mechanism 4. This mechanism consists essentially of two endless moving chains 13 passing around toothed wheels 14 and each fitted with a series of spaced grippers 15 which are so arranged that the grippers on one chain register with those on the other chain. Each gripper 15 has a cutting jaw 16 to co-act with the cutting jaw of the registering gripper whereby the continuous wire is firmly gripped between them. The grippers are provided with rollers 17 or equivalent contact members adapted to bear against longitudinal control cams 18 so as to thereby actuate the cutting jaws 16.

The grippers 15 are spaced on the chains according to the length into which the flux coated wire is to be cut. When the grippers initially come into action at the leading end of the draw-bench 4, the rollers 17 are out of engagement with the control cams 18 and the jaws 16 of the said grippers are thus spaced apart and do not grip the wire. In the course of movement of the chains, the rollers 17 come into engagement with the inclined portions 19 of the control cams and are thus acted upon to cause the registering gripper jaws 16 to close together and firmly grip the wire on its opposite sides. The wire is thereby moved along the draw-bench, the action of the latter being such that the wire from the reel 2 is drawn continuously through the apparatus.

At the opposite or tail end of the draw-bench, the gripper jaws 16 are actuated to shear the then gripped wire into rods. This is effected by means of levers 20 which are operated in timed manner by cam wheels 21 on the main shaft 22. In the operation of said levers their ends 23 are moved inwardly and engage the rollers 17, thus causing the registering gripping jaws 16 to be brought together to sever the wire by shearing action. The gripper jaws are then released by the disengagement of their rollers 17 from the control cams 18, and the grippers pass beneath the draw-bench to the opposite end thereof by the movement of the chains.

The flux coated rods are now transferred by suitable mechanical means from the draw-bench 4 and are deposited into the suitably heated drying oven 5 through which they are carried, preferably by means of a travelling conveyor. The transfer mechanism, which may form part of the draw-bench or be a separate device, deposits the flux coated weld rods into the drying oven in such a way that liability of damage being caused to the flux coating of the said rods is minimized.

In lieu of the shearing grippers 15 on the draw-bench, other means may be employed for mechanically severing the continuous flux coated wire into weld rods of requisite length. Other means may also be provided for feeding the wire continuously through the apparatus. For example, the continuous wire may be forced or pushed through the apparatus by means of rotating grip rollers or other appropriate feed devices (not illustrated) instead of being drawn through by the draw-bench.

In manufacturing electrodes having wound-on asbestos yarn or other fibrous yarn, a winding apparatus 24 is provided between the serrating device 8 and the flux extrusion or coating apparatus 3, see Fig. 2. This winding apparatus may be of the character shown in Figs. 6 and 7, and comprises a disc 25 having a central hole 26 therein for the passage of the wire. The disc 25 is rotatably supported in a suitable bracket, bearing or the like (not shown) and is driven at high speed relative to the movement of the continuous wire 1 by a belt passing round a pulley wheel 27 on the said disc.

Carried by the disc 25 are a series of rods 28 which support spools 29 on which the asbestos or other yarn is wound. The end of the yarn is connected to the continuous wire 1 and in the movement of the latter and the rotary action of said disc, the yarn is wound helically onto the travelling wire. Any number of yarns may be applied by providing the required number of spools 29 on the disc 25.

In manufacturing electrodes of the kind having helically wound wire reinforcements, such as described in the United States Patent No. 1,760,534 dated the 27th May, 1930, the spools 29 on the disc 25 are wound with wire instead of yarn. To provide a series of wires wound in one direction and a tying wire wound in the opposite direction, a number of spools corresponding to the number of the series of wires are provided on the disc 25 and an additional disc containing one spool is provided in advance of the disc 25, said additional disc being rotated in the opposite direction to that of the first mentioned disc.

In manufacturing electrodes having loose asbestos or organic fibre or the like applied thereto such as described in the United States patent application Serial No. 507,732, filed the 9th January, 1931, since matured into Patent No. 1,909,679, dated May 16, 1933, the additional devices that are shown in Fig. 3 are included in the apparatus. The continuous wire after passing through the serrating device 8 is fed through a vessel 30 containing an adhesive, such as silicate of soda, which is applied evenly to the wire in its travel through the said vessel. The adhesive coated wire then passes into the fibre applying chamber 31.

The chamber 31 includes a rotating agitator 32 to maintain the fibre in a state of agitation and suitable baffles 33 to direct the fibre onto the adhesive coated wire passing through the chamber. The upper end of said chamber may have a suitable flue 34 to provide for the escape of dust. Adjacent to the outlet hole 36 of the said chamber is a rotating helical spring 35, through which the moving continuous wire 1 passes. Said spring by its rotary action removes surplus fibre adhering to the wire.

Beneath the chamber 31 there may be provided a suitable heater 37 to maintain the fibre in dry state.

Figure 10:
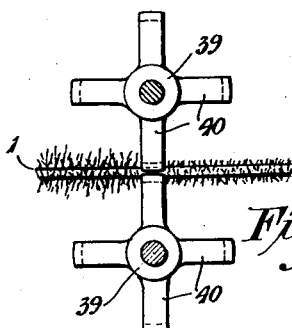
Fig. 10 is a plan view of means for trimming the fibre applied in loose state to the continuous wire.
Figure 11:
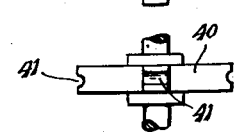
Fig. 11 is a side view of Fig. 10.

The fibre covered wire passing from the chamber 31 is subjected to the action of a trimming device 38, see Figs. 10 and 11. This trimming device preferably consists of two rotating members 39 having radial arms 40, each of which is formed with a groove 41 at its outer end. The two members 39 rotate in unison so that their arms 40 come together with the grooves 41 providing clearance for the travelling continuous wire. The action of the rotating members 39 wraps the fibre around the wire 1 and also trims the said wire of any surplus fibre that may be adhering to it, thus leaving a substantially uniform fibrous covering on the wire.

Figure 6:
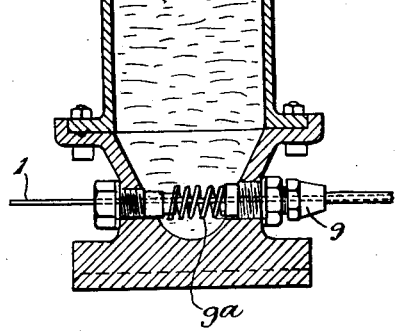
Figs. 6 and 7 are views in side elevation and in end elevation, respectively, of means for winding thread, or asbestos or organic yarn, or wire onto the continuous wire.
Figure 7:
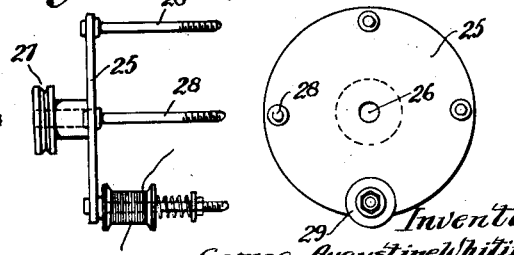

After the said wrapping and trimming operation, the fibre covered wire may pass to a winding device 42 similar to that previously described and illustrated in Figs. 6 and 7. This winding device winds a cotton or other suitable thread around the fibrous material of the wire to hold the fibre in position and to centralize the covered wire within the nozzle or die of the extrusion or coating apparatus, thus ensuring a uniform and substantially thick flux coating. After the application of the flux coating, the continuous wire passes to the draw-bench and severing mechanism 4 to be sheared into required lengths, which are transferred to and carried through the drying oven 5 as has been previously described.

The improved apparatus as herein described is continuous in operation and performs the several sequential operations in a wholly automatic manner, thus enabling arc welding electrodes to be manufactured expeditiously and at reduced cost compared with present manufacturing methods and apparatus. Furthermore, the finished electrodes are of uniform character, and of good appearance, while the flux coating is not impared as is usual with electrodes manufactured by prior methods involving the handling of the rods while their flux coatings are in a moist or plastic condition.

What I do claim is:—

1. Automatic weld rod manufacturing apparatus comprising, in combination, means for feeding fusible wire in continuous length, means for coating said wire with material adapted to render it suitable for the purpose for which said weld rods are intended, means for cutting said wire into pieces of predetermined length, a drying oven, means for depositing said pieces in said drying oven and means for automatically carrying said wire successively from one to the other of said previously mentioned means in the order herein stated, without any handling between said feeding means and said drying oven.

2. Apparatus according to claim 1 in which the coating means comprise an automatic device for applying flux to the fusible wire.

3. Apparatus according to claim 1 in which the coating means comprise a flux-extrusion and coating appliance.

4. Apparatus according to claim 1 in which the coating means comprise an appliance adapted to wind yarn around said wire.

5. Apparatus according to claim 1 in which the coating means comprise an appliance adapted to wind a metallic armour around said wire.

6. Apparatus according to claim 1 in which the coating means comprise an automatic device for applying loose fibrous material around said wire.

7. Apparatus according to claim 1 in which the coating means comprise automatic devices for applying loose fibrous material to said wire and for trimming the loose ends of said fibrous material after it has been applied to said wire.

8. Apparatus according to claim 1 in which the coating means comprise automatic devices for applying adhesive to the wire and for applying loose fibrous material to the adhesive-coated wire.

9. Apparatus according to claim 1 in which the coating means comprise automatic devices for applying fibrous material to the wire and for applying flux to said fibrous material-coated wire.

10. Apparatus according to claim 1 in which the means for carrying the wire through the apparatus include a plurality of grippers adapted to pull the wire.

11. Apparatus according to claim 1 in which the means for carrying the wire through the apparatus and for cutting the wire into pieces of predetermined length comprise a series of grippers adapted to grip and pull the wire, and means associated with said grippers for severing the wire at predetermined portions of its length.

12. In an apparatus according to claim 1, an automatic wire-straightener inserted between the feeding means and the coating means.

13. In an apparatus according to claim 1, an automatic device for serrating the wire, inserted between the feeding means and the coating means, substantially as and for the purpose set forth.

G. A. WHITING.